(12) United States Patent
Weitzel et al.

(10) Patent No.: US 7,939,592 B2
(45) Date of Patent: May 10, 2011

(54) USE OF VINYL CHLORIDE-ETHYLENE COPOLYMERS FOR HYDROPHOBING CONSTRUCTION SUBSTANCES

(75) Inventors: Hans Peter Weitzel, Reischach (DE); Hermann Lutz, Emmerting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/582,932

(22) Filed: Oct. 21, 2009

(65) Prior Publication Data

US 2010/0041796 A1   Feb. 18, 2010

Related U.S. Application Data

(63) Continuation of application No. 11/569,700, filed as application No. PCT/EP2005/005414 on May 18, 2005, now abandoned.

(30) Foreign Application Priority Data

Jun. 1, 2004   (DE) .................. 10 2004 026 610

(51) Int. Cl.
   *C08K 5/09*   (2006.01)
   *C08K 3/00*   (2006.01)

(52) U.S. Cl. ............................ 524/322; 524/7

(58) Field of Classification Search .................... 524/322
   See application file for complete search history.

(56) References Cited

U.S. PATENT DOCUMENTS

| | | | |
|---|---|---|---|
| 4,826,534 A * | 5/1989 | Shubow | 106/18.11 |
| 4,859,751 A * | 8/1989 | Schulze et al. | 526/200 |
| 5,567,750 A | 10/1996 | Schulze et al. | |
| 6,090,868 A | 7/2000 | Eck et al. | |
| 6,242,512 B1 | 6/2001 | Figge et al. | |
| 6,350,808 B1 | 2/2002 | Schmitz et al. | |
| 6,441,082 B1 | 8/2002 | Weitzel et al. | |
| 6,919,398 B1 | 7/2005 | Born et al. | |
| 2003/0005861 A1 | 1/2003 | Dietrich et al. | |
| 2003/0164478 A1 | 9/2003 | Fiedler et al. | |
| 2004/0019141 A1 * | 1/2004 | Bastelberger et al. | 524/261 |

FOREIGN PATENT DOCUMENTS

| | | |
|---|---|---|
| DE | 23 41 085 | 3/1975 |
| DE | 19901307 C1 | 6/2000 |
| DE | 19921876 A1 | 6/2000 |
| DE | 10232993 A1 | 2/2004 |
| EP | 0149098 A2 | 7/1985 |
| EP | 0224169 A2 | 6/1987 |
| EP | 0342609 A2 | 11/1989 |
| EP | 0717016 A1 | 6/1996 |
| EP | 1193287 A2 | 4/2002 |
| EP | 1394198 A1 | 3/2004 |
| JP | 60124612 A | 7/1985 |
| JP | 63055143 A | 3/1988 |
| JP | 04143344 A | 5/1992 |
| JP | 07041632 A | 2/1995 |
| JP | 08337460 A | 12/1996 |
| JP | 11503790 A | 3/1999 |
| WO | WO 95/20627 | 8/1995 |
| WO | WO 97/18175 | 5/1997 |
| WO | 9849205 A1 | 11/1998 |
| WO | WO 02/31036 A1 | 4/2002 |

OTHER PUBLICATIONS

Long-term performance of Redispersable powders in mortars, Cement and Concrete Research, 31 (3), Mar. 2001, pp. 357-362.
Chemical Abstract XP002338490, Zhang, Jie, "Longterm performance of redispersible emulsion powder in mortars".
Patbase Abstract corresponding to WO 95/20627.
Patbase Abstract corresponding to EP 1193287 A2.
Patbase Abstract corresponding to DE 2341085.
Patbase Abstract corresponding to DE 10232993 A1.
Patbase Abstract corresponding to EP 0224169 A2.

* cited by examiner

*Primary Examiner* — Ling-Siu Choi
*Assistant Examiner* — Hui Chin
(74) *Attorney, Agent, or Firm* — Brooks Kushman P.C.

(57) ABSTRACT

Copolymers of ethylene and vinyl chloride also containing a protective colloid, optionally in conjunction with a fatty acid compound or precursor thereof or with an organosilicon compound, can be employed to increase the water repellency of hydraulically settable construction materials.

10 Claims, No Drawings

USE OF VINYL CHLORIDE-ETHYLENE COPOLYMERS FOR HYDROPHOBING CONSTRUCTION SUBSTANCES

CROSS-REFERENCE TO RELATED APPLICATION

This application is a continuation of U.S. application Ser. No. 11/569,700 filed Nov. 28, 2006 as a U.S. National Phase of PCT Appln. No. PCT/EP2005/005414 filed May 18, 2005, which claims priority to German Application No. 10 2004 026 610.7 filed Jun. 1, 2004.

BACKGROUND OF THE INVENTION

1. Field of the Invention

The invention relates to the use of vinyl chloride-ethylene copolymers for imparting water repellency to construction materials, especially for surface-coating materials such as skim coats, monocouche coatings and joint fillers.

2. Description of the Related Art

Polymers based on vinyl ester, vinyl chloride, (meth)acrylate monomers, styrene, butadiene and ethylene are employed in particular in the form of their aqueous dispersions or water-redispersible polymer powders in numerous applications, for example as coating materials or adhesives for any of a very wide variety of substrates. These polymers are stabilized using protective colloids or surface-active compounds of low molecular weight. Polyvinyl alcohols are generally employed as protective colloids. These products find use in particular as binders in hydraulically setting adhesives such as tile adhesives, and in plasters and levelling compounds based on cements or gypsums.

Skim coats or monocouche and joint fillers are each applications which impose very exacting requirements on the water resistance or water repellency of the finished components. By skim coats are meant very thin finish-coat plasters or smoothing-trowel applications with a thickness of generally 1 to 2 mm. Monocouche is a term for single-coat plasters which also serve as decorative plasters at the same time. In order to meet the water repellency requirements of these applications, the formulations must be hydrophobically modified accordingly.

From DE-A 2341085, EP-A 342609, EP-A 717016 and EP-A 1193287 it is known to add fatty acid esters as water repellents to lime- or cement-bound plasters. A common disadvantage in this case is the hydrophobizing nature of these additives. When dry plasters which include such water repellents are stirred into water, the materials are wetted only poorly, and therefore the processing properties are markedly impaired.

Water-redispersible powders based on homopolymers or copolymers of ethylenically unsaturated monomers are used in the building sector as binders, in combination with hydraulically setting binders such as cement. In building adhesives, plasters, mortars and paints, for example, they serve to improve the mechanical strength and the adhesion. From WO-A 95/20627, WO-A 02/31036 and DE-A 10233933 it is known to use hydrophobizing additives such as organosilicon compounds and fatty acid esters as a component of redispersible powders in dry mortars. This circumvents the problem of the poor wettability and processing properties. The hydrophobicizing effect, however, is dependent on the proportion of the water repellent in the redispersible powder, and therefore cannot be varied arbitrarily.

From EP-A 149098 and EP-A 224169 it is known to use vinyl chloride-ethylene copolymers as an additive to hydraulically setting compositions for the purpose of improving their mechanical strength, especially compressive strength, abrasion resistance, flexural strength under tension and adhesive strength under tension.

An object which existed was to provide a polymer composition in the form of its aqueous dispersion or in the form of its water-redispersible powder which is suitable for use in construction materials for which a very high water repellency effect is required. For joint fillers, modified with 1% by weight of polymer, based on dry mass, the water absorption according to EN 12808 after 3 hours should be $\leq 5$ ml. For skim-coat plasters, modified with 1% by weight of polymer, based on dry mass, the water absorption determined by the method of Karsten is to be $\leq 2$ ml after 300 minutes.

SUMMARY OF THE INVENTION

It has now been discovered that the previously discussed objects can be achieved through use of an aqueous dispersion or redispersible powder prepared therefrom, containing an ethylene/vinyl chloride copolymer and a protective colloid.

DETAILED DESCRIPTION OF THE PREFERRED EMBODIMENT

The invention provides for the use of polymer compositions in the form of their aqueous dispersion or in the form of their water-redispersible powder for imparting water repellency to construction materials, comprising
 a) a vinyl chloride-ethylene copolymer and
 b) 5% to 30% by weight of one or more protective colloids, and also
 c) in powder form, 5% to 30% by weight of one or more anti-blocking agents, and also,
if desired, further additives,
the amounts in % by weight being based on the total weight of the polymer powder composition and adding up in each case to 100% by weight.

The vinyl chloride-ethylene copolymer contains preferably 50% to 95% by weight of vinyl chloride units and 5% to 30% by weight of ethylene, more preferably 75% to 90% by weight of vinyl chloride units and 10% to 25% by weight of ethylene, based in each case on the total weight of the copolymer.

If desired it is also possible for up to 20% by weight of further comonomers to have been copolymerized. Examples thereof are monomers from the group consisting of vinyl esters, (meth)acrylic esters and vinylaromatics. Suitable vinyl esters are those of carboxylic acids having 1 to 12 carbon atoms. Preference is given to vinyl acetate, 1 methylvinyl acetate, vinyl esters of α-branched monocarboxylic acids having 9 to 11 carbon atoms, examples being VeoVa9$^R$ or VeoVa10$^R$ (trade names of Resolution Performance Products). Suitable monomers from the acrylic and methacrylic ester group are esters with branched or unbranched alcohols having 1 to 15 carbon atoms. Preferred acrylic and methacrylic esters are methyl acrylate, methyl methacrylate, n-butyl acrylate, t-butyl acrylate and 2-ethylhexyl acrylate. A preferred vinylaromatic is styrene.

If desired it is also possible for 0.1% to 5% by weight, based on the total weight of the monomer mixture, of auxiliary monomers to be copolymerized. Preference is given to ethylenically unsaturated monocarboxylic and dicarboxylic acids such as acrylic acid and methacrylic acid; ethylenically unsaturated carboxamides and carbonitriles such as acrylamide and acrylonitrile; and ethylenically unsaturated sulphonic acids and their salts, preferably vinylsulphonic acid or 2-acrylamido-2-methylpropanesulphonic acid. Further examples are pre-crosslinking comonomers such as polyethylenically unsaturated comonomers, examples being divinyl adipate, diallyl maleate, allyl methacrylate and triallyl cyanurate, or post-crosslinking comonomers, examples being N-methylolacrylamide (NMA), alkyl ethers such as the isobutoxy ether or esters of N methylolacrylamide. Further examples are silicon-functional comonomers, such as (meth) acryloyloxypropyltri(alkoxy)silanes.

The most preferred copolymers are vinyl chloride-ethylene copolymers without further comonomer units.

Suitable protective colloids are water-soluble polymers from the group consisting of fully and partly hydrolysed polyvinyl alcohols; polyvinylpyrrolidones; polyvinyl acetals; polysaccharides in water-soluble form such as starches (amylose and amylopectin), celluloses and their carboxymethyl, methyl, hydroxyethyl and hydroxypropyl derivatives; proteins such as casein and caseinate, soya protein, and gelatin; lignosulphonates; synthetic polymers such as poly(meth) acrylic acid, copolymers of (meth)acrylates with carboxy-functional comonomer units, poly(meth)acrylamide, polyvinylsulphonic acids and the water-soluble copolymers thereof; melamine-formaldehyde sulphonates, naphthalene-formaldehyde sulphonates, styrene-maleic acid copolymers and vinyl ether-maleic acid copolymers.

Preference is given to fully or partly hydrolysed polyvinyl alcohols having a degree of hydrolysis of 80 to 100 mol %, especially partially hydrolysed polyvinyl alcohols having a degree of hydrolysis of 80 to 95 mol % and a Höppler viscosity, in 4% strength aqueous solution, of 1 to 30 mPas, preferably 3 to 15 mPas (method according to Höppler at 20° C., DIN 53015).

Preference is also given to partially or fully hydrolysed, hydrophobically modified polyvinyl alcohols having a degree of hydrolysis of 80 to 100 mol % and a Höppler viscosity, in 4% strength aqueous solution, of 1 to 30 mPas, preferably 3 to 15 mPas. Examples of such are partially hydrolysed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and alpha-olefins having 2 to 12 carbon atoms such as ethene, propene and decene. The fraction of the hydrophobic units is preferably 0.1% to 10% by weight, based on the total weight of the partially or fully hydrolysed polyvinyl alcohol. Particular preference is given to partially or fully hydrolysed copolymers of vinyl acetate with isopropenyl acetate, having a degree of hydrolysis of 95 to 100 mol %. Mixtures of the said polyvinyl alcohols can also be used.

Maximum preference is given to partially hydrolysed polyvinyl alcohols having a degree of hydrolysis of 85 to 94 mol % and a Höppler viscosity, in 4% strength aqueous solution, of 3 to 15 mPas (Höppler method at 20° C., DIN 53015) and to partially or fully hydrolysed copolymers of vinyl acetate with isopropenyl acetate, having a degree of hydrolysis of 95 to 100 mol %. The said polyvinyl alcohols are obtainable by means of processes that are known to the skilled person.

Suitable anti-blocking agents c) are Ca carbonate, Mg carbonate, talc, gypsum, ground clays, kaolins such as metakaolin and finely ground aluminium silicates, kieselguhr, colloidal silica gel, and pyrogenic silicon dioxide, in each case with particle sizes preferably in the range from 10 nm to 10 µm.

Further additives, which can be used optionally, are preferably hydrophobicizing additives d). Examples of such are additives d1), i.e., fatty acids and fatty acid derivatives which under alkaline conditions liberate fatty acid or the corresponding fatty acid anion, and/or additives d2), i.e., organosilicon compounds. In general, component d) is used in an amount of 1% to 20% by weight, preferably 1% to 10% by weight, based in each case on the total weight of the polymer composition.

Suitable for use as component d1) are, generally, fatty acids and fatty acid derivatives which under alkaline conditions, preferably a pH >8, liberate fatty acid and/or the corresponding fatty acid anion. Preference is given to fatty acid compounds from the group consisting of fatty acids having 8 to 22 carbon atoms, their metal soaps, their amides, and their esters with monohydric alcohols having 1 to 14 carbon atoms, with glycol, with polyglycol, with polyalkylene glycol, with glycerol, with mono-, di- or triethanolamine, or with monosaccharides.

Suitable fatty acids are branched and unbranched, saturated and unsaturated fatty acids having in each case 8 to 22 carbon atoms. Examples are lauric acid (n-dodecanoic acid), myristic acid (n-tetradecanoic acid), palmitic acid (n-hexadecanoic acid), stearic acid (n-octadecanoic acid) and oleic acid (9-dodecenoic acid).

Suitable metal soaps are those of the abovementioned fatty acids with metals from main groups 1 to 3 and transition group 2 of the PTE, and also with ammonium compounds $NX_4^+$, where X is identical or different and stands for H, $C_1$ to $C_8$ alkyl radical and $C_1$ to $C_8$ hydroxyalkyl radical. Preference is given to metal soaps with lithium, sodium, potassium, magnesium, calcium, aluminium and zinc and with the ammonium compounds.

Suitable fatty acid amides are those obtainable with mono- or diethanolamine and with the abovementioned $C_8$ to $C_{22}$ fatty acids.

Fatty acid esters suitable as component d1) are the $C_1$ to $C_{14}$ alkyl and alkylaryl esters of the stated $C_8$ to $C_{22}$ fatty acids, preferably methyl, ethyl, propyl, butyl and ethylhexyl esters and also the benzyl esters.

Suitable fatty acid esters are also the mono-, di- and polyglycol esters of the $C_8$ to $C_{22}$ fatty acids.

Further suitable fatty acid esters are the monoesters and diesters of polyglycols and/or polyalkylene glycols having up to 20 oxyalkylene units, such as polyethylene glycol and polypropylene glycol.

Also suitable are the mono-, di- and tri-fatty acid esters of glycerol with the stated $C_8$ to $C_{22}$ fatty acids, and also the mono-, di- and tri-fatty acid esters of mono-, di- and triethanolamine with the stated $C_8$ to $C_{22}$ fatty acids.

Also suitable are the fatty acid esters of sorbitol and mannitol.

Particularly preferred are the $C_1$ to $C_{14}$ alkyl and alkylaryl esters of lauric acid and oleic acid, mono- and diglycol esters of lauric acid and oleic acid, and the mono-, di- and tri-fatty acid esters of glycerol with lauric acid and oleic acid.

Suitable components d2) are silicic esters $Si(OR')_4$, silanes such as tetraorganosilanes $SiR_4$ and organoorganoxysilanes $Si_n(OR')_{4-n}$ with n=1 to 3, polysilanes with preferably the general formula $R_3Si(SiR_2)_nSiR_3$ with n=0 to 500, organosilanols $Si_n(OH)_{4-n}$, di-, oligo- and polysiloxanes composed of units of the general formula $R_cH_dSi(OR')_e(OH)_fO_{(4-c-d-e-f)/2}$ with c=0 to 3, d=0 to 1, e=0 to 3, f=0 to 3 and the sum c+d+e+f not more than 3.5 per unit, R in each case being identical or different and denoting branched or unbranched alkyl radicals having 1 to 22 carbon atoms, cycloalkyl radicals having 3 to 10 carbon atoms, alkylene radicals having 2 to 4 carbon atoms, and aryl, aralkyl and alkylaryl radicals having 6 to 18 carbon atoms, and R' denoting identical or different alkyl radicals and alkoxyalkylene radicals having in each case 1 to 4 carbon atoms, preferably methyl and ethyl, it also being possible for the radicals R and R' to be substituted by halogens such as Cl or by ether, thioether, ester, amide, nitrile, hydroxyl, amine, carboxyl, sulphonic acid, carboxylic anhydride and carbonyl groups, and in the case of the polysilanes it also being possible for R to have the definition OR'. Also suitable are carbosilanes, polycarbosilanes, carbosiloxanes, polycarbosiloxanes and polysilylenedisiloxanes.

Preferred components d2) are tetramethoxysilane, tetraethoxysilane, methyltripropoxysilane, methyltri(ethoxyethoxy)silane, vinyltri(methoxyethoxy)silane, (meth)acryloyloxypropyltrimethoxysilane, (meth)acryloyloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydropolysiloxanes terminally blocked with trimethylsiloxy groups, copolymers of dimethylsiloxane and methylhydrosiloxane units that are terminally blocked with trimethylsiloxy groups, dimethylpolysiloxanes, and also dimethylpolysiloxanes having Si—OH groups in the terminal units. Maximum preference is given to the organoorganoxysilanes $Si_n(OR')_{4-n}$ with n=1 to 3, especially isooctyltriethoxysilane, n-octyltriethoxysilane and hexadecyltriethoxysilane.

The polymer composition is prepared in conventional manner by means of free-radically initiated emulsion polymerization in an aqueous medium, followed by spray drying of the resultant aqueous polymer dispersion. One suitable process, for example, is that described in EP-A 149098. The emulsion polymerization is carried out in the presence of protective colloid and/or emulsifier. Stabilization is preferably effected exclusively with protective colloid.

The aqueous polymer dispersions thus obtainable generally have a solids content of 25% to 70% by weight, preferably 45% to 65% by weight.

To prepare water-redispersible polymer powders the aqueous dispersions are dried, by means of spray drying for example. Spray drying generally takes place following the addition of further protective colloid as a spraying aid. The anti-blocking agent c) is preferably added while the powder is still in suspension in the drying gas. If the powder comprises further additives d), they are added before, during or after spray drying. Preferably the addition of the additives d) takes place to the polymer dispersion, prior to the spray drying thereof in the case of redispersible powders.

The polymer compositions based on vinyl chloride-ethylene copolymers are suitable for imparting water repellency to hydraulically setting building materials. This is preferably the case in applications which require a very high level of water repellency.

Such applications are, in particular, single-layer coatings (plasters), such as skim coats or monocouche coats, but also joint fillers. By skim coats are meant very thin finish-coat plasters or smoothing-trowel-applied systems with a thickness of generally 1 to 3 mm. Monocouche is a term for single-coat plasters which at the same time are decorative plasters. In the case of joint fillers the water absorption according to EN 12808 after 3 hours is ≦5 ml. In the case of plaster coatings the water absorption, determined by the method of Karsten, should be ≦2 ml after 300 minutes, in each case in formulations containing 1% by weight of polymer based on dry mass of the formulation.

Typical formulations for dry mortars are known to the skilled person. They contain 5% to 50% by weight of mineral binder, 5% to 80% by weight of filler, 0.1% to 10% by weight of polymer, and 0% to 30% by weight of further additives, the amounts in % by weight in the formulation adding up to 100% by weight. Suitable mineral binders are cement, gypsum, waterglass or lime hydrate. Examples of fillers which can be used are carbonates such as calcium carbonate in the form of dolomite, calcite and chalk. Further examples are silicates, such as magnesium silicate in the form of talc, or aluminium silicates such as loam and clays; quartz flour, quartz sand, highly disperse silica, feldspar, heavy spar and light spar. Also suitable are fibrous fillers. In practice, mixtures of different fillers are frequently used.

Examples of further additives are pigments, an example being titanium dioxide as an inorganic pigment, and also the customary organic pigments. Examples of further additives are wetting agents in fractions of generally 0.1% to 0.5% by weight, based on the total weight of the formulation. Examples of such are sodium and potassium polyphosphates, polyacrylic acids and salts thereof. Other additives which may be mentioned include thickeners, which are generally used in an amount of 0.01% to 2.0% by weight, based on the total weight of the formulation. Customary thickeners are cellulose ethers, starches, or bentonite, as an example of an inorganic thickener. Further additives are preservatives, defoamers, air-pore formers, plasticizers, retardants, accelerants and frost preventatives.

To produce the ready-to-use construction materials the dry mortar modified with the redispersible powder is stirred together with the required amount of water on the construction site. Dry mortars can also be modified on site by adding the aqueous polymer dispersions, diluted where appropriate.

The examples which follow serve to illustrate the invention further.

Dispersion:

The dispersion used was an aqueous, polyvinyl alcohol-stabilized dispersion of a copolymer of vinyl chloride and ethylene. It was prepared by emulsion polymerization. It was stabilized using 10% by weight of a polyvinyl alcohol having a degree of hydrolysis of 88 mol % and a Höppler viscosity of 4 mPas. The copolymer composition was 80% by weight vinyl chloride and 20% by weight ethylene.

As a further component the dispersion contained 0% (dispersion 1), 5% (dispersion 2) or 10% (dispersion 3) by weight of methyl dodecanoate (dodecanoic acid methyl ester; DME), based on dry weight.

Powders:

The powders were prepared by spray drying the aforementioned dispersions, in the presence of 10% by weight in each case of a polyvinyl alcohol having a degree of hydrolysis of 88 mol % and a Höppler viscosity of 13 mPas. In the examples indicated in table 1, isooctyltriethoxysilane (IOTS) and, where appropriate, methyl dodecanoate (DME) were included at the spray-drying stage. The dispersion was sprayed by means of a two-fluid nozzle. Precompressed air at 4 bar was used as a spraying component, and the drops formed were dried with heated air at 125° C. in co-current. The dry powder obtained was admixed with 10% by weight of standard commercial anti-blocking agent (mixture of calcium magnesium carbonate and magnesium hydrosilicate). These powders constitute inventive Examples 1-7 and their composition is set forth in Table 1, and their use properties in Table 2.

Example 8 (Comparative)

Redispersible powder based on a vinyl chloride/vinyl acetate/ethylene copolymer with a Tg of about 10° C., plus isooctyltriethoxysilane as water repellency additive.

Comparative Example C1

Redispersible powder based on a vinyl acetate/VeoVa10/butyl acrylate copolymer with a Tg of about 15° C., plus methyl dodecanoate as water repellency additive.

TABLE 1

| Example | Dispersion | DME (% by wt.) | IOTS (% by wt.) |
|---|---|---|---|
| 1 | 1 | 0 | 4 |
| 2 | 1 | 2 | 4 |
| 3 | 2 | 0 | 4 |
| 4 | 2 | 2 | 4 |
| 5 | 3 | 0 | 4 |
| 6 | 3 | 2 | 4 |
| 7 | 1 | 0 | 0 |
| 8 | | | 4 |
| C1 | | 2 | |

Testing of a Skim Coat Formulation:
Formulation 1 (Skim Coat):

| | |
|---|---|
| Portland cement 42.5 | 300.0 parts by weight |
| Calcium carbonate | 700.0 parts by weight |
| Cellulose ether | 2.5 parts by weight |
| Redispersible powder | 10.0 parts by weight |
| Total | 1012.5 parts by weight |
| Water required | 38.0 parts by weight |

Determination of Water Absorption by the Karsten Method:

In this test the water absorption, WA, of the specimen was measured, in ml, after defined periods of time (in minutes). This was done by using a suitable bonding agent to bond a Karsten glass tube to the test substrate as described in DIN EN 1323. After the water tube had been filled, the amount of water absorbed by the substrate is determined at defined intervals of time. The greater the amount, the poorer the water repellency imparted to the specimen.

Testing of the Adhesive Strength Under Tension:

To determine the substrate adhesion the mortar was applied to a concrete slab using a stencil (50 mm diameter, 10 mm thickness). After the mortar has hardened, after 27 days, epoxy resin adhesive is used to adhere metal tensioning anchors to the mortar layer to be tested, in order to carry out the tensile adhesion test.

The tensile adhesion values were tested in each case after a 14-day storage period at 23° C. and 50% atmospheric humidity using a tensile apparatus from the company Herion with a rate of load increase of 250 N/s. The measurement values in $N/mm^2$ are averages of 5 measurements.

TABLE 2

| Example | WA 10' | WA 30' | WA 60' | WA 120' | WA 180' | WA 240' | WA 300' | TA $N/mm^2$ |
|---|---|---|---|---|---|---|---|---|
| 1 | 0.1 | 0.25 | 0.5 | 0.65 | 0.9 | 1.15 | 1.45 | 0.65 |
| 2 | 0.15 | 0.3 | 0.55 | 0.75 | 0.95 | 1.25 | 1.55 | 0.74 |
| 3 | 0.1 | 0.2 | 0.45 | 0.6 | 0.85 | 1.05 | 1.35 | 0.78 |
| 4 | 0.1 | 0.25 | 0.45 | 0.65 | 0.9 | 1.15 | 1.45 | 0.85 |
| 5 | 0.1 | 0.2 | 0.35 | 0.6 | 0.8 | 1.05 | 1.15 | 0.8 |
| 6 | 0.1 | 0.2 | 0.4 | 0.65 | 0.85 | 1.05 | 1.25 | 0.97 |
| 7 | 0.15 | 0.3 | 0.60 | 0.80 | 1.0 | 1.35 | 1.85 | 0.78 |
| C8 | 0.1 | 0.3 | 0.55 | 0.85 | 1.1 | 1.45 | 1.90 | 0.75 |
| C1 | 0.2 | 0.45 | 0.65 | 1.05 | 1.25 | 1.65 | 2.05 | 0.73 |

Testing of a Joint Filler Formulation:
Formulation 2 Point Filler):

| | |
|---|---|
| Portland cement CEM I 42.5 | 340.0 parts by weight |
| Sand | 649.5 parts by weight |
| Cellulose ether | 0.5 parts by weight |
| Redispersible powder | 10.0 parts by weight |
| Total | 1000.0 parts by weight |
| Water required | 22.0 parts by weight |

Determination of Water Absorption for Joint Fillers According to DIN EN 12808:

A determination is made of the amount of water, in g, absorbed after defined periods of time on a mortar prism measuring 8×4×4 cm, which has been given a watertight seal on the side faces and stored for 28 days under standard conditions prior to testing.

The higher the figure, the poorer the water repellency imparted to the specimen.

The processing properties are determined on a qualitative basis by the person carrying out the processing.

Testing of Flexural Strength Under Tension (FS):

To test the flexural strength under tension, in a method based on DIN 18555, prisms measuring 16×4×4 cm were produced using the various mortars and, before testing, were stored for 28 days under standard conditions.

Testing of Compressive Strength (CS):

To test the compressive strength, in a method based on DIN 18555, prisms measuring 16×4×4 cm were produced using the various mortars and, before testing, were stored for 28 days under standard conditions.

Testing of the Abrasion Resistance (AR):

The abrasion resistance is determined in accordance with EN 12808 or EN ISO 10545-6. A rotating steel disc acts on the test specimen under defined pressure and with application of abrasive. After 50 rotations of the steel disc the abrasion of the specimen is reported, in $mm^3$. The higher the figure, the lower the abrasion resistance.

TABLE 3

| Ex. | Processing | WA (30') [ml] | WA (360') [ml] | FS [$N/mm^2$] | CS [$N/mm^2$] | Hardness | AR ($mm^3$) |
|---|---|---|---|---|---|---|---|
| 1 | good | 1.41 | 2.92 | 2.75 | 8.39 | good | 1365 |
| 2 | good | 0.45 | 1.33 | 2.67 | 7.95 | good | 1280 |
| 3 | good | 1.45 | 2.7 | 2.47 | 9.34 | good | 1260 |
| 4 | good | 0.38 | 1.28 | 2.61 | 7.78 | good | 1195 |
| 5 | good | 1.24 | 2.81 | 2.96 | 10.39 | good | 1380 |
| 6 | good | 0.31 | 1.12 | 2.46 | 7.52 | good | 1232 |
| 7 | good | 1.50 | 3.1 | 2.53 | 7.45 | good | 1215 |
| 8 | good | 0.91 | 3.3 | 2.24 | 6.84 | good | 1556 |
| C1 | good | 1.35 | 3.6 | 2.35 | 7.25 | good | 1450 |

Discussion of the Results:

From the data it is apparent that the skim coats and jointing materials of the invention exhibit much lower water absorption values while having at least equivalent or even improved mechanical values.

What is claimed is:

1. A process for the preparation of a water repellant single layer architectural coating comprising applying to a substrate a hydraulically settable mineral binder composition containing 0.1 to 10 weight percent based on dry weight of the composition, of a polymer composition in the form of a water-redispersible powder or an aqueous dispersion thereof, the water-redispersible powder comprising:
   a) a vinyl chloride-ethylene copolymer consisting of up to 95 weight percent of vinyl chloride residues and 5 to 30 weight percent of ethylene residues, the weight percents based on the total weight of the vinyl chloride-ethylene copolymer;
   b) 5 to 30 weight percent of one or more protective colloids, based on the weight of a), b), and c); and
   c) 5 to 30 weight percent of one or more anti-blocking agents in powder form, based on the weight of a), b), and c).

2. The process of claim 1, wherein the single layer coating is a skim coat or monocouche coat.

3. The process of claim 1, wherein at least one protective colloid b) is selected from the group consisting of partially hydrolyzed polyvinyl alcohols having a degree of hydrolysis of 85 to 94 mol % and a Höppler viscosity of 3 to 15 mPas in 4% strength aqueous solution (Höppler method at 20° C., DIN 53015), and partially or fully hydrolyzed copolymers of vinyl acetate with isopropenyl acetate having a degree of hydrolysis of 95 to 100 mol %.

4. The process of claim 1, further comprising at least one additive selected from the group consisting of d1) fatty acids and fatty acid derivatives which under alkaline conditions liberate fatty acid or the corresponding fatty acid anion, and d2) organosilicon compounds.

5. The process of claim 4, wherein component d1) comprises one or more fatty acid compounds selected from the group consisting of fatty acids having 8 to 22 carbon atoms; their metal soaps; their amides; and their esters with $C_{1-14}$ monohydric alcohols, with glycol, with polyglycol, with polyalkylene glycol, with glycerol, with mono-, di- or triethanolamine, and with monosaccharides.

6. The process of claim 1, wherein component d2) comprises at least one silicon compound selected from the group consisting of silicic esters, silanes, polysilanes, organosilanols and di-, oligo- and polysiloxanes.

7. The process of claim 1, wherein the copolymer a) contains 75 to 95 percent by weight of vinyl chloride moieties.

8. The process of claim 1, wherein the single layer architectural coating has a thickness of 3 mm or less.

9. The process of claim 1, wherein the single layer architectural coating has a thickness of from 1 to 3 mm.

10. The process of claim 1, wherein the single layer architectural coating is a plaster coating and has a water absorbtion $\leq 2$ ml after 300 minutes at a polymer composition loading of 1 weight percent based on the dry weight of the hydraulically settable mineral binder composition.

* * * * *